United States Patent [19]
Marsh, Jr. deceased et al.

[11] 4,416,463
[45] Nov. 22, 1983

[54] BULK STORAGE CART

[76] Inventors: William E. Marsh, Jr. deceased, late of New Braunfels, Tex.; Elizabeth A. Marsh, executrix, 36 Guada Cono, New Braunfels, Tex. 78130

[21] Appl. No.: 318,919

[22] Filed: Nov. 6, 1981

[51] Int. Cl.³ .............................................. B62B 1/10
[52] U.S. Cl. .............................. 280/79.3; 211/49 R; 160/329; 410/51
[58] Field of Search .................... 280/79.1, 79.3, 79.2, 280/47.34, 179 R, 33.99 H, 33.99 R; 211/49 R; D34/24, 26; 160/327, 328, 329; 410/2, 4, 31, 32, 46, 51, 96, 121, 156, 129, 140

[56] References Cited
U.S. PATENT DOCUMENTS

| 788,710 | 9/1903 | Whitlock | 410/51 |
| 3,211,264 | 10/1965 | Streeter | 160/328 |
| 3,567,068 | 3/1971 | Carfizzi | 280/79.2 |
| 3,861,704 | 1/1975 | De Witte | 280/79.3 |
| 4,350,357 | 9/1982 | Zenner | 280/79.3 |

Primary Examiner—Joseph F. Peters, Jr.
Assistant Examiner—Timothy Roesch
Attorney, Agent, or Firm—John C. Stahl

[57] ABSTRACT

A bulk storage cart comprising a base, opposing side walls and rear wall secured to said base, a top-gate assembly secured to said side walls and/or rear wall, said assembly including a plurality of protected springs connecting by a corresponding number of cables to a foot plate adapted to be detachably secured to said base, thereby forming a gate for said cart.

14 Claims, 13 Drawing Figures

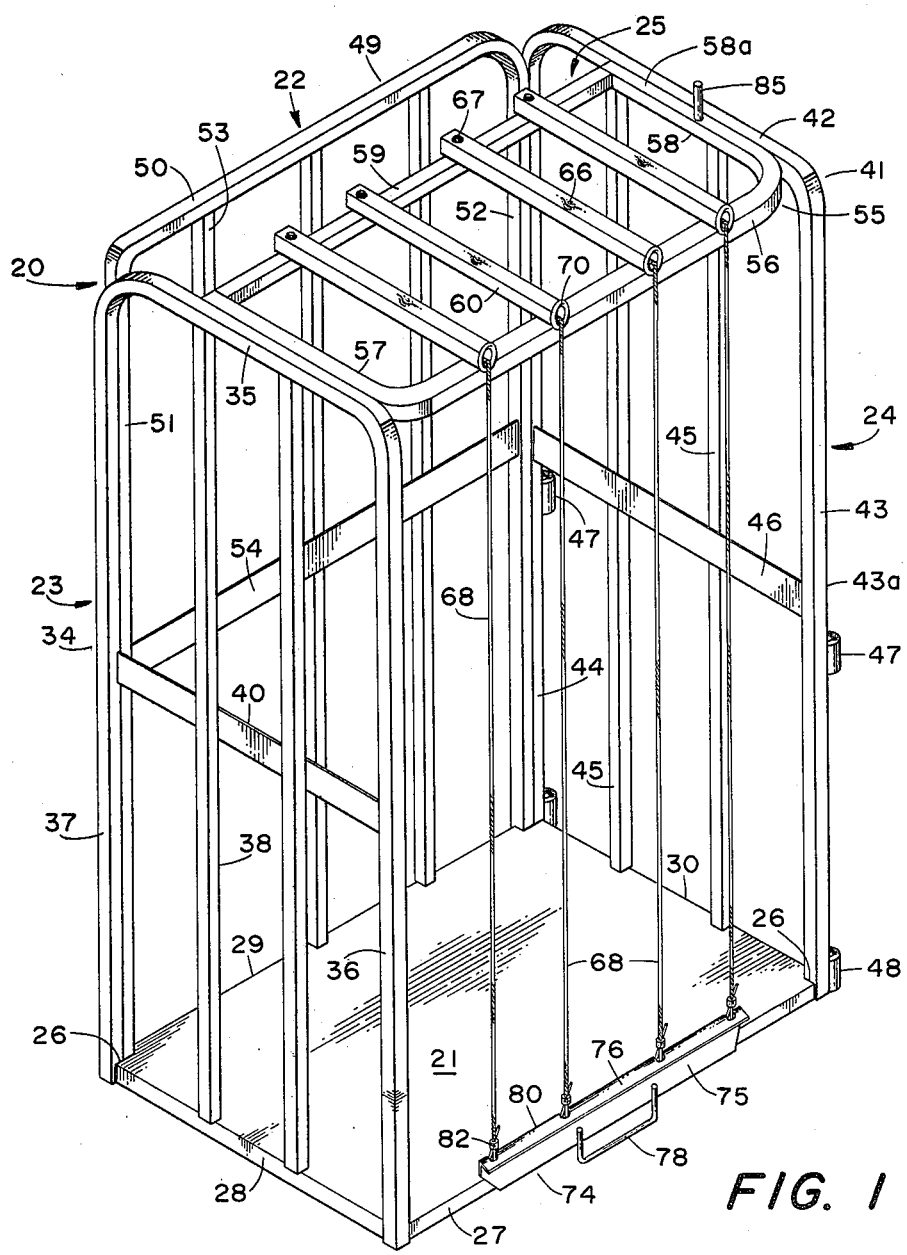
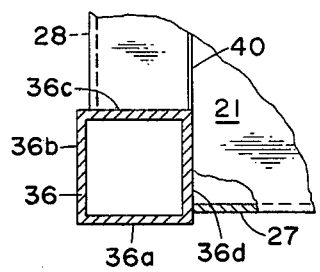
FIG. 2
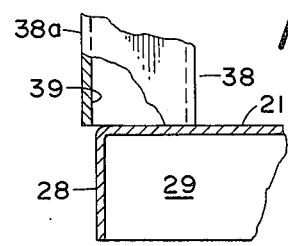
FIG. 3
FIG. 1

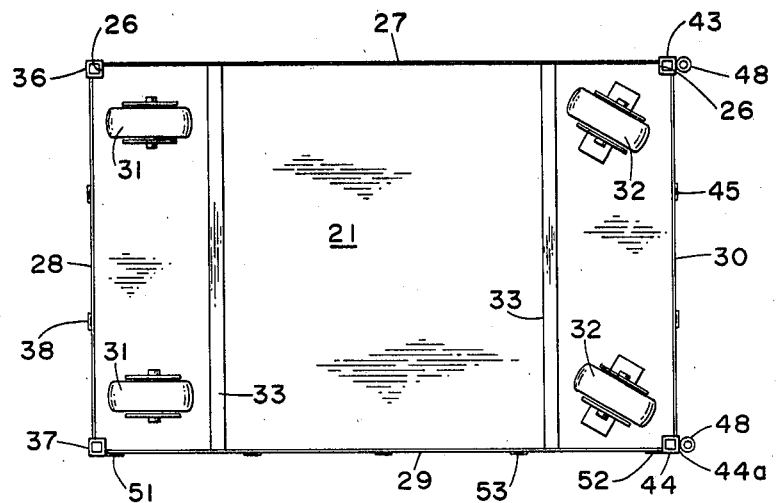
FIG. 4
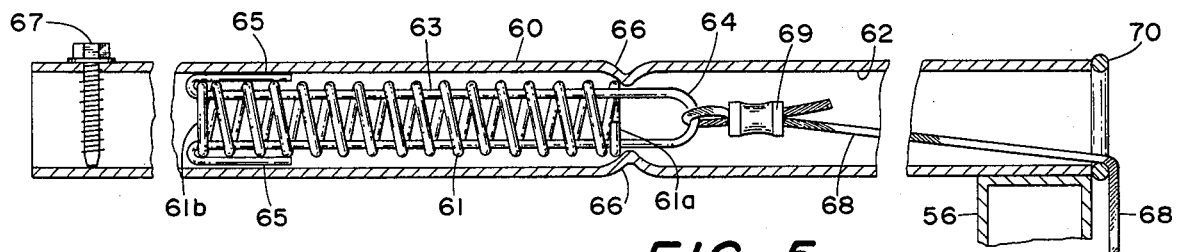
FIG. 5
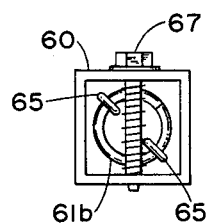      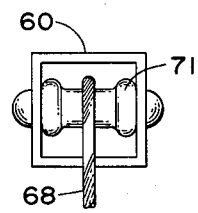
FIG. 6          FIG. 7
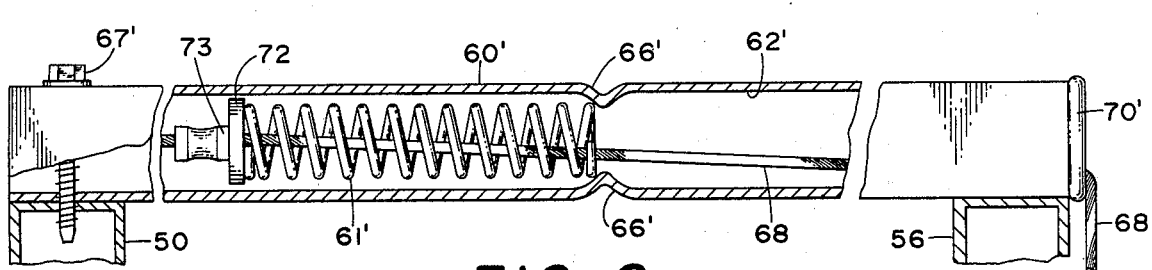
FIG. 8

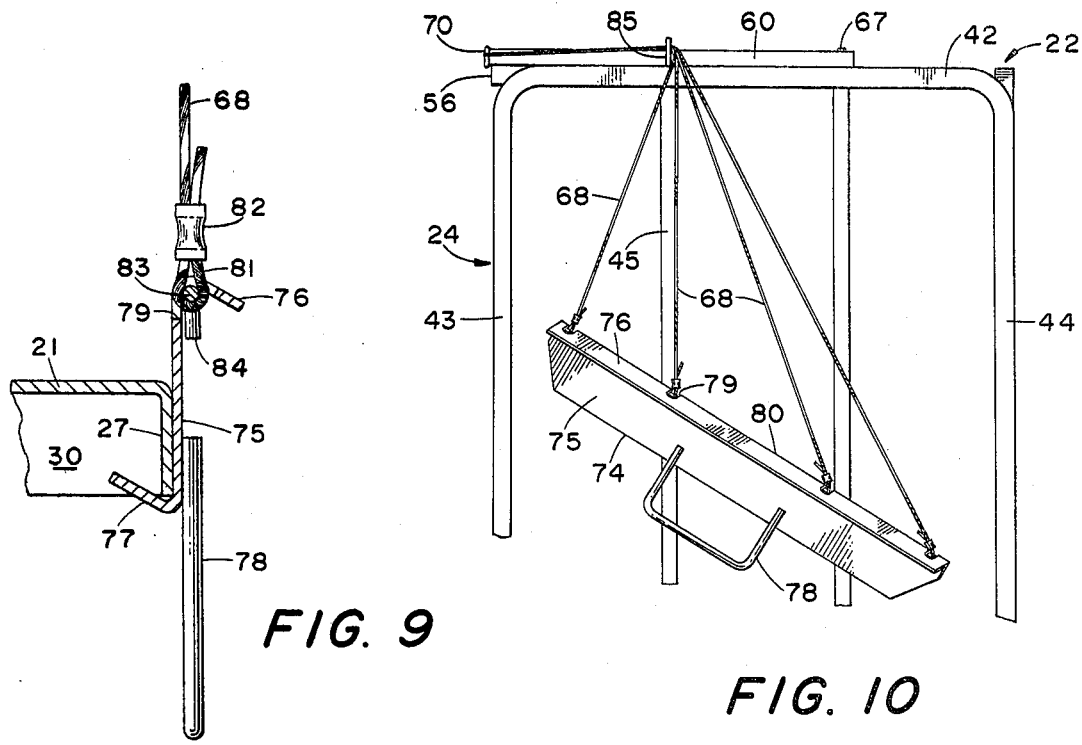
FIG. 9
FIG. 10
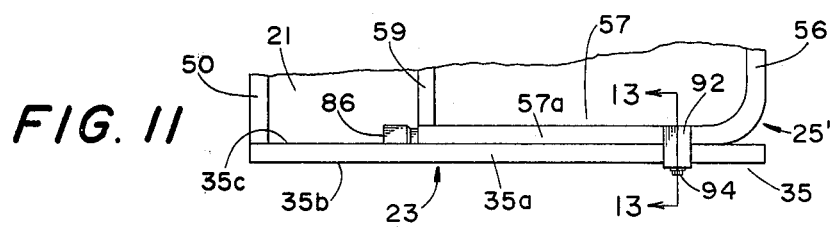
FIG. 11
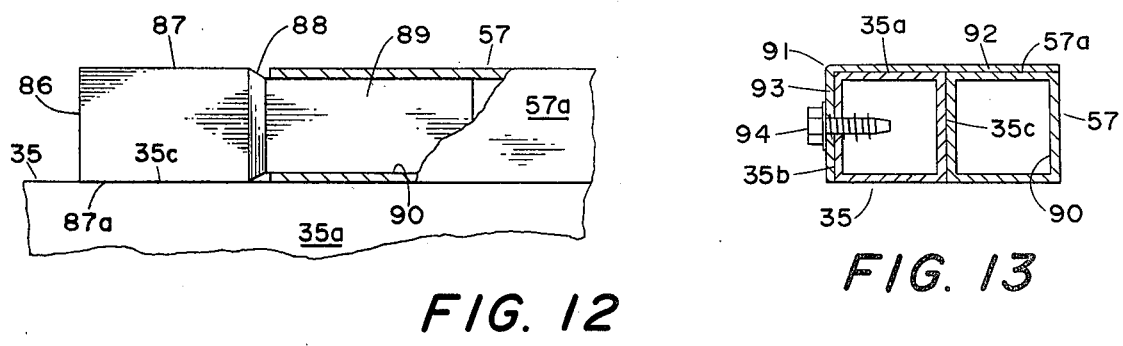
FIG. 12
FIG. 13

BULK STORAGE CART

BACKGROUND OF THE INVENTION

In general, bulk storage carts are utilized as mobile containers for transporting stacked products from a production facility or warehouse to a retail outlet, for displaying the stacked products at such retail outlet, and also for collecting empty returnable packages at the retail outlet.

U.S. Pat. No. 3,861,704 includes a comprehensive survey of the prior art, including the use of dollies, trucks and carts, especially those designed to carry cases of soft drinks and the like.

SUMMARY OF THE INVENTION

The principal object of the invention is to provide a bulk storage cart which is adapted for use with specialized vehicles designed for the soft drink industry.

Another object is to provide such a cart which is of rigid, durable construction yet is attractive in design, a desirable feature when used in a retail outlet.

Still another object is to provide such a bulk storage cart which is capable of mass production techniques, relatively inexpensive to manufacture, easy to use and maintain in operable condition, and universal in its adaptability.

Other objects and features of the invention will become apparent to those skilled in the art from a consideration of the following specification when read in the light of the annexed drawings.

BRIEF DESCRIPTION OF THE DRAWINGS

FIG. 1 is a front perspective view of the bulk storage cart of the subject invention.

FIG. 2 is a fragmentary, greatly enlarged top plan view, partly broken away, of the front left corner of the cart of FIG. 1.

FIG. 3 is a fragmentary, greatly enlarged vertical sectional view through the lower left side wall.

FIG. 4 is a bottom plan view of the cart.

FIG. 5 is a greatly enlarged vertical sectional view, partly broken away, through a preferred embodiment of tubular member of the subject invention.

FIG. 6 is a greatly enlarged rear elevational view of the tubular member of FIG. 5.

FIG. 7 is a front elevational view showing a modification of the front end of the tubular member of the subject invention.

FIG. 8 is a greatly enlarged side elevational view, partly broken away and partly in section, of another embodiment of tubular member.

FIG. 9 is a greatly enlarged vertical sectional view through the foot plate and base of the subject invention.

FIG. 10 is a fragmentary side elevational view, showing the cables and foot plate in stored condition.

FIG. 11 is a fragmentary top plan view of another embodiment of top-gate assembly, adapted to be detachably secured in position.

FIG. 12 is a fragmentary greatly enlarged top plan view, partly broken away and partly in section, of means for detachably securing the rearmost end of the top-gate assembly of FIG. 11; and FIG. 13 is a greatly enlarged vertical sectional view, taken on the line 13—13 of FIG. 11, looking in the direction of the arrows.

DESCRIPTION OF PREFERRED EMBODIMENTS

Referring now to the drawings, wherein like reference characters designate like or corresponding parts throughout the several views, there is shown in FIG. 1 a preferred embodiment of bulk storage cart 20 of the subject invention consisting, in general, of base 21, rear wall 22, opposing left and right side walls 23–24, and top-gate assembly 25. Base 21, essentially rectangular in plan and of flat sheet steel, includes square cutouts 26 in each corner. Downturned flanges 27–30 are provided on said base intermediate cutouts 26, said flanges terminate downwardly in the same horizontal plane. Two rigid casters 31, transversely aligned and adapted to rotate in planes parallel to the major axis, are mounted on the undersurface of said base substantially left of the medial, minor axis thereof; two transversely aligned swivel casters 32 are mounted equidistantly and to the right of said medial axis. Transversely extending, spaced channels 33 or other structural members are conventionally secured to the undersurface of said base intermediate flanges 27, 29 and centrally of casters 31, 32.

For purposes of convenience only, left side wall 23 will be described in detail; it is understood that right side wall 24 is substantially similar in construction. Wall 23 includes, in part, vertically extending and inverted U-shaped member 34 preferably of tubular, metallic material; member 34 consists of horizontally extending cross piece 35 and perpendicularly downturned front and rear members 36–37, respectively, the lower ends of which are adapted to insert into cutouts 26 on the left of base 21; said members 36, 37 terminate downwardly in the horizontal plane of flanges 27–30 and are secured as by welding to said base and/or adjacent flanges thereof. As shown in FIG. 2, front face 36a of member 36 is desirably positioned at least slightly anteriorly of flange 27 while outer side 36b is at least slightly laterally of flange 28.

A plurality of intermediate vertical members 38, preferably of the same cross-sectional shape, size and composition as member 34, equidistantly spaced relative to members 36, 37 and lying in the vertical plane thereof, are secured upwardly to cross piece 35 and butt welded or otherwise secured to the upper surface of base 21; as shown in FIG. 3, outer side 38a of each such member 38 extends at least slightly laterally of the corresponding flange 28 whereby at least a portion of bore 39 of each such tubular member 38 opens downwardly, thereby providing a drain for any liquid or condensate accumulating therein. A horizontally extending flat metallic strap 40, positioned at least slightly above the midpoint of said left side, is secured to the inner side of members 38, bowed slightly outwardly to lie in the plane of inner side 36d of member 36 (see FIG. 2) and butt welded to rear face 36c thereof. The opposing end of said strap is secured to rear member 37 in like manner.

Right side wall 24, substantially similar to left side wall 23, includes inverted U-shaped member 41 consisting of cross piece 42 and perpendicularly downturned front and rear members 43–44 adapted to insert into cutouts 26 in the right of said base and secured thereto and/or the adjacent flanges. If desired, a pipe or rod (not shown) may be driven upwardly into each of said members 43, 44 to provide increased structural strength. Intermediate vertical members 45, equidistantly spaced and lying in the vertical plane of members 43–44, are secured upwardly to cross piece 42 and downwardly to base 21 in the manner and for the purpose heretofore described in connection with vertical members 38; strap 46, lying in the horizontal plane of strap 40, is secured to members 43-45, respectively. A pair of horizontally aligned and vertically opening bushings 47 are secured to outer sides 43a, 44a of the respective front and rear members 43, 44 at least slightly below the horizontal plane of strap 46; a second pair of horizontally aligned and vertically opening bushings 48 are secured to said outer sides 43a, 44a with the lower ends thereof extending at least slightly below the lower edge of flanges 27-30. Bushings 47, 48 are to be used to secure cart 20 in a delivery vehicle in a manner well known in the art.

Rear wall 22 of metallic tubular stock includes inverted U-shaped member 49 consisting of cross piece 50 adapted to lie in the horizontal plane of cross pieces 35, 42 and perpendicularly downturned members 51-52 vertically aligned with and adapted to snugly fit between rear members 37, 44 and preferably welded thereto, with the lower ends of members 51, 52 butt welded or otherwise secured to the upper surface of the base; a plurality of intermediate vertical members 53, equidistantly spaced, are secured upwardly to cross piece 50 and downwardly to base 21 in the manner heretofore described in connection with vertical members 38 and 45. Strap 54, horizontally aligned with straps 40 and 46, is secured to the front faces of members 51-53, respectively.

In recapitulation, in the preferred embodiment of the invention the front faces of members 36 and 43 extend at least slightly anteriorly of flange 27; the outer sides of members 36-38 extend at least slightly laterally of flange 28; the rear faces of members 51-53 extend at least slightly posteriorly of flange 29; and the outer sides of members 43-45 extend at least slightly laterally of flange 30.

Top-gate assembly 25 includes rearwardly opening, U-shaped member 55 consisting of cross piece 56 and perpendicularly rearward extending left and right side members 57-58. Cross piece 56 is adapted to lie in the longitudinal, vertical plane of front members 36, 43 while side members 57, 58 are adapted to horizontally align with and snugly fit between cross pieces 35, 42 of the respective side walls 23, 24. In the embodiment of FIG. 1, top-gate assembly 25 is fixedly secured in such position as by welding or the like; it is to be understood, however, that the invention is not to be restricted solely to such construction but also contemplates top-gate assembly 25' detachably secured in such position (see FIGS. 11-13).

Longitudinally extending cross member 59 of tubular or bar stock is horizontally aligned with and butt welded or otherwise secured to the approximate rear end of side members 57, 58. A plurality of transversely extending, equidistantly spaced tubular members 60 are fixedly secured to cross piece 56 and cross member 59, respectively. More particularly, each tubular member 60 terminates forwardly at least slightly anteriorly of the vertical plane of the front face of cross piece 56, and rearwardly, at least slightly posteriorly of the rear face of member 59, or, said tubular member 60 may extend substantially rearwardly, overlying cross piece 50 and be fixedly secured thereto.

In the embodiment of FIG. 5, compression spring 61 is carried in bore 62 of said tubular member, said spring normally lying on its side when no force is applied thereto; an elongate, generally U-shaped draw bar 63 is carried in said spring with bight 64 extending at least slightly forwardly of foremost coil 61a of spring 61; opposing and forwardly directed hooks 65 on the remote end of said draw bar are adapted to partially pass around rearmost coil 61b of said spring. As viewed in FIG. 6, draw bar 63 desirably extends diagonally across bore 62 and is used to uniformly compress spring 61 in a manner hereinafter to be described.

Opposing depressions 66 or other stop means are provided in the approximate medial portion of each tubular member 60 and serve as a forward limit stop for spring 61; screw 67 is passed through opposing walls of member 60 rearwardly of cross member 59 to prevent accidental discharge of said spring in the event of cable malfunction and to minimize theft of such springs.

One end of cable 68 is passed through bight 64 of said draw bar, turned back upon itself and collar 69 or other securing means passed around such parts and crimped or otherwise fastened. Ring 70, desirably secured to the foremost end of member 60, serves as a bearing surface and minimizes damage to cable 68 passing therethrough. In the modification of FIG. 7, a transversely extending roller 71 is mounted in the foremost end of said tubular member 60 with cable 68 passing thereover for such purpose.

There is shown in FIG. 8 of the drawings an elongated tubular member 60' attached forwardly to cross piece 56 in the manner heretofore described and rearwardly to cross piece 50, wherein screw 67' is passed downwardly through member 60' into cross piece 50. In such embodiment, compression spring 61' is carried in bore 62' rearwardly of the opposing depression 66' or other forward stop means. Cable 68 is passed rearwardly through spring 61' and thence through washer 72 or the like with collar 73 or other securing means carried on the approximately end of said cable. As heretofore described, cable 68 passes forwardly through ring 70' or over the roller assembly of FIG. 7.

Foot plate 74 (see FIGS. 1 and 9) is connected to the remote end of each cable 68. Plate 74, of flat metallic stock and at least slightly greater in length than the corresponding distance between the most lateral tubular members 60 on top-gate assembly 25, consists of longitudinally and vertically extending section 75 adapted to bear against the medial portion of flange 27 in the secured condition; section 75 terminates upwardly in a forwardly and angularly downturned lip 76, and downwardly in a rearwardly and angularly upturned lip 77 adapted to engage flange 27. Downwardly depending handle 78 is secured to the medial, outer surface 75. A plurality of longitudinally spaced, vertically extending slots 79 are provided in radius 80 formed between sections 75 and lip 76.

A loop 81 is to be formed at a predetermined location on the remote end of each cable 68 by turning said cable back upon itself and securing the same by collar 82 or the like. Elongated rod 83, terminating laterally in short perpendicular legs 84, is passed through each such loop 81, said rod normally lies in the interior angle formed between section 75 and lip 76.

The user may depress foot plate 74 by exerting a downward force upon handle 78 thereby causing spring 61 or 61' remotely connected thereto to compress; at such time the user moves plate 74 rearwardly against flange 27 with lip 77 passing therebelow. Upon releasing such downward force, lip 77 engages flange 27, said compression springs return to normal condition, cables 68 are drawn taut, and an effective gate is provided for such cart.

When the gate thus formed is not in use, as illustrated in FIG. 10, foot plate 74 is conveniently secured in an out-of-the-way position. More particularly, vertically extending pin 85 is secured to top 58a of right side member 58 in approximate vertical alignment with the foremost intermediate vertical member 45 of right side wall 24. Cables 68 may conveniently be passed rearwardly of said pin 85 with foot plate 74 lying flat against said side wall.

As heretofore mentioned and as illustrated in FIGS. 11–13 of the drawings, top-gate assembly 25', substantially similar to assembly 25 heretofore described in detail, may be detachably secured in the desired position; this construction permits nesting of two carts, especially desirable for shipping. For purposes of convenience only, those additions and/or modifications to cross piece 35 of left side wall 23 and left side member 57 of assembly 25 will be described in detail; it is understood that corresponding additional members will be provided on the opposing cross piece 42 and right side member 58, respectively.

As best seen in FIG. 12, shaped piece 86 includes base 87 essentially square in cross section and preferably of the same cross sectional shape and size as member 34, forwardly bevelled intermeidate section 88, and forwardly extending reduced section 89, essentially square in cross section and adapted to be journaled into rearwardly opening bore 90 of left side member 57. Side 87a of base 87 is fixedly secured to inner side 35a of cross piece 35 in approximate vertical alignment with the rearmost vertical member 38 of left side wall 23.

L-shaped bracket 91 includes base 92 and perpendicularly depending leg 93; the innermost half of said base 92 is fixedly secured to top 57a of left side member 57 while the remainder of said base bears against top 35a of cross piece 35 and is supported thereon; leg 93 extends laterally of outer side 35b of cross piece 35 with screw 94 or the like passed through said leg into at least said cross piece.

As heretofore mentioned, the bulk storage cart 20 is used for transporting stacked products, especially cases of soft drinks from a production facility or warehouse to a retail outlet, for displaying the cases of soft drinks at such retail outlet, and for collecting cases of empty bottles at the retail outlet for return of the production facility.

Normally four full cases of soft drinks are plced in side-by-side relationship on base 21; four additional rows of full cases may also be placed in such relationship in the cart. Cables 68 bear against a selected portion of the foremost end of each such case thereby retaining the same in said cart.

It should be understood, of course, that the foregoing disclosure relates to only preferred embodiments of the invention and that it is intended to cover all changes and modifications of the invention herein chosen for the purposes of the disclosure which do not constitute departures from the spirit and scope of the invention.

What is claimed is:

1. A bulk storage cart comprising
   a base,
   a plurality of casters mounted on said base,
   opposing side walls secured downwardly to said base,
   a rear wall secured laterally to said side walls,
   a top-gate assembly secured to at least said side walls,
   a plurality of tubular members on said top-gate assembly,
   a compression spring carried in each tubular member,
   forward limit stop means for said spring in each tubular member,
   spring compressing means associated with each spring,
   a cable connected at one end to each spring compressing means,
   a foot plate connected remotely to each of said cables,
   said foot plate adapted to be detachably secured to said base thereby forming a gate for said cart.

2. The invention of claim 1 wherein said top-gate assembly is fixedly secured in position.

3. The invention of claim 1 wherein said top-gate assembly is detachably secured in position.

4. The invention of claim 1 wherein said tubular members terminate rearwardly at least slightly anteriorly of the vertical plane of said rear wall.

5. The invention of claim 1 wherein said tubular members are secured to said rear wall.

6. The invention of claim 1 wherein said spring compressing means consists of a draw bar carried in each spring.

7. The invention of claim 1 wherein said spring compressing means consists of passing said cable through said spring, a washer carried on said cable rearwardly of said spring, and means retaining said washer on said cable.

8. The invention of claim 1 wherein a ring is secured to the foremost end of each tubular member, said cable adapted to pass through said ring.

9. The invention of claim 1 wherein a roller is mounted in the foremost end of each tubular member, said cable passing over said roller.

10. The invention of claim 1 further including means on said top-gate assembly to secure said cables and gate in an out-of-the-way position.

11. A bulk storage cart comprising
    a base,
    a plurality of casters mounted on said base,
    opposing side walls secured to said base,
    a rear wall secured laterally to said opposing side walls,
    a longitudinally extending cross piece secured to at least said side walls substantially above said base,
    a plurality of tubular members secured forwardly to said cross piece,
    a compression spring carried in each tubular member,
    forward limit stop means for said spring in each tubular member,
    spring compressing means associated with each spring,
    means associated with the foremost end of each tubular member to change the direction of travel of said cable,
    a foot plate connected remotely to each of said cables,
    said cables and foot plate forming a gate for said cart.

12. The invention of claim 11 wherein said tubular members are secured rearwardly to said rear wall.

13. In combination with a bulk storage cart consisting of a base, opposing side walls, rear wall, and cross piece secured laterally to opposing upper side walls:
    a plurality of tubular members secured to at least said cross piece,
    a compression spring carried in each tubular member, forward limit stop means for said spring in each tubular member, spring compressing means associated with each spring, means associated with the foremost end of each tubular member to change the direction of travel of said cable, said cables and foot plate forming a gate for said cart.

14. The invention of claim 13 wherein each of said tubular members is secured forwardly to said cross piece and rearwardly to said rear wall.

* * * * *